United States Patent
Hashimoto et al.

(10) Patent No.: US 10,858,007 B2
(45) Date of Patent: Dec. 8, 2020

(54) VEHICLE CONTROL SYSTEM

(71) Applicant: TOYOTA JIDOSHA KABUSHIKI KAISHA, Toyota (JP)

(72) Inventors: Ryuta Hashimoto, Susono (JP); Akira Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/208,795

(22) Filed: Dec. 4, 2018

(65) Prior Publication Data
US 2019/0225224 A1 Jul. 25, 2019

(30) Foreign Application Priority Data

Jan. 24, 2018 (JP) .................. 2018-009820

(51) Int. Cl.
*B60Q 1/34* (2006.01)
*B60W 30/095* (2012.01)
*B60W 30/18* (2012.01)
*B60W 50/10* (2012.01)
*G08G 1/16* (2006.01)

(52) U.S. Cl.
CPC ....... *B60W 30/18163* (2013.01); *B60Q 1/346* (2013.01); *B60W 30/0953* (2013.01); *B60W 30/0956* (2013.01); *B60W 50/10* (2013.01); *G08G 1/167* (2013.01); *B60W 2554/801* (2020.02)

(58) Field of Classification Search
CPC ....... B60W 30/18163; B60W 30/0956; B60W 50/10; B60W 30/0953; B60W 2550/308; G08G 1/167; B60Q 1/346

USPC .......................................... 701/23
See application file for complete search history.

(56) References Cited

U.S. PATENT DOCUMENTS

| 2011/0313665 A1* | 12/2011 | Lueke .................. G01S 13/931 701/301 |
| 2013/0093582 A1* | 4/2013 | Walsh ................... B60Q 1/525 340/436 |
| 2016/0023588 A1* | 1/2016 | Peterson .............. B60Q 1/2615 315/77 |
| 2016/0185388 A1* | 6/2016 | Sim ....................... B60W 10/20 701/41 |
| 2017/0200371 A1* | 7/2017 | Glander ............... B60W 40/04 |
| 2018/0012496 A1 | 1/2018 | Hasberg et al. |

(Continued)

FOREIGN PATENT DOCUMENTS

| JP | 2017-178068 A | 10/2017 |
| WO | 2016119952 A1 | 8/2016 |
| WO | 2017159509 A1 | 9/2017 |

*Primary Examiner* — Behrang Badii
*Assistant Examiner* — Hossam M Abd El Latif
(74) *Attorney, Agent, or Firm* — Sughrue Mion, PLLC

(57) ABSTRACT

The lane change intention discrimination portion executes intention discrimination processing when it receives from the vehicle control ECU an instruction for controlling the blinker. The intention discrimination processing is processing to discriminate what type of pattern for the lane change operation was demanded in the instruction for controlling the blinker. The start and exit timing setting portion executes timing setting processing based on a discrimination result of the intention discrimination processing. The timing setting processing is processing to set a start timing and an exit timing of the lighting operation of the blinker.

5 Claims, 7 Drawing Sheets

(56) References Cited

U.S. PATENT DOCUMENTS

| | | |
|---|---|---|
| 2018/0162416 A1 | 6/2018 | Honda et al. |
| 2019/0047621 A1* | 2/2019 | Kim ..................... B62D 15/025 |
| 2019/0092333 A1* | 3/2019 | Ishioka ................. B60Q 1/488 |
| 2019/0152525 A1* | 5/2019 | Resch ..................... G01C 21/34 |
| 2019/0168732 A1* | 6/2019 | Tashiro ................. F02D 41/107 |
| 2019/0168757 A1* | 6/2019 | Tokimasa ............... B60K 31/00 |
| 2019/0193739 A1* | 6/2019 | Tokimasa ............... B60K 31/00 |
| 2019/0202462 A1* | 7/2019 | Wu ..................... B60W 40/105 |

* cited by examiner

FIRST SCENE:
LANE CHANGE OPERATION IN WHICH OVERTAKING IS INTENDED

SECOND SCENE:
LANE CHANGE OPERATION IN WHICH CUT-IN AND OVERTAKING ARE INTENDED

THIRD SCENE:
LANE CHANGE OPERATION IN WHICH DIVERGENT OPERATION IN NEAR FUTURE IS ANTICIPATED

FOURTH SCENE:
LANE CHANGE OPERATION IN WHICH DIVERGENT OPERATION IN NEAR FUTURE IS ANTICIPATED AND CUT IN IS INTENDED

FIFTH SCENE:
LANE CHANGE OPERATION IN WHICH INTERFLOW TO MAIN LANE IS INTENDED

S20 OTHER THAN CUT-IN?
S22 VITAL LANE CHANGE FOR REACHING DESTINATION OR INTERFLOW?
S24 THRESHOLDS TH1 TO TH3 ARE CHANGED
S26 CUT-IN?
S28 START TIMING IS SET TO BE EARLIER TIMING THAN DEFALT VALUE AND EXIT TIMING IS SET TO BE LATER TIMING THAN DEFALT VALUE
S30 START TIMING AND EXIT TIMINGS ARE SET TO DEFALT VALUE

VEHICLE CONTROL SYSTEM

CROSS-REFERENCE TO RELATED APPLICATION

The present disclosure claims priority under 35 U.S.C. § 119 to Japanese Patent Applications No. 2018-009820, filed on Jan. 24, 2018. The contents of these applications are incorporated herein by reference in their entirety.

TECHNICAL FIELD

The present disclosure relates to a vehicle control system. More specifically, the present disclosure relates a vehicle control system to control lighting operation of a blinker (a turn signal).

BACKGROUND

JP 2017-178068 A discloses a travel assist device which executes lane change control. When the travel assist device receives from a driver of a vehicle an instruction for lane change, it starts to execute the lane change control. In addition, the travel assist device starts to execute lighting control of a blinker which is provided in a destination lane side of the vehicle. In other words, the lane change control and the lighting control are executed synchronously.

Considering a case where an automatic driving of a vehicle is executed in accordance with a travel plan from a start point to a destination. In this case, it is assumed a situation where a lane change operation to cut into a congested lane is required. In such a situation, it is not preferable that the lighting operation is simply executed while synchronizing with the execution of the lane change control. This is because there is a possibility an intention of the lane change may not be sufficiently conveyed to the vehicles on the congested lane. Therefore, it is desirable to improve to communicate reliably with surroundings of the vehicle about the intention of the lane change during the automatic driving of the vehicle.

The present disclosure addresses the above described problem, and an object of the present disclosure is, to provide a technology to communicate reliably with the surroundings of the vehicle about the intention of the lane change during the automatic driving of the vehicle.

SUMMARY

A first aspect of the present disclosure is a vehicle control system for solving the problem described above and has the following features.

The vehicle control device comprises a travel control device and a blinker control device.

The travel control device is configured to execute an automatic driving including a lane change operation, a divergent operation or an interfluent operation in accordance with a travel plan from a start point to a destination.

The blinker control device is configured to execute a lighting operation of a blinker in synchronization with the execution of the lane change operation, the divergent operation or the interfluent operation in accordance with an instruction for lighting from the travel control device.

The blinker control device is also configured to execute intention discrimination processing and timing setting processing.

The intention discrimination processing is processing to discriminate an intention for lane change in the instruction for lighting.

The timing setting processing is processing to set a period of the lighting operation variably based on a discrimination result of the intention discrimination processing.

A second aspect of the present disclosure has the following features according to the first aspect.

The vehicle control system further comprises an information acquisition device.

The information acquisition device is configured to acquire driving environment information indicating driving environment of a subject vehicle.

In the intention discrimination processing, the blinker control device is configured to:

specify, based on the travel plan, which of the operation is demanded by the instruction for lighting among the lane change operation, the divergent operation and the interfluent operation;

calculate, based on the driving environment information, density of vehicles on a destination lane at the lane change; and when the instruction for lighting is specified to demand the lane change operation and the density is greater than or equal to a first threshold, discriminate that the intention for lane change is cut-in.

In the timing setting processing, the blinker control device is configured to set a start timing of the lighting operation, based on a discrimination result where the intention for lane change is cut-in, to a timing earlier than a default value for start.

A third aspect of the present disclosure has the following features according to the first aspect.

The vehicle control system further comprises an information acquisition device.

The information acquisition device is configured to acquire driving environment information indicating driving environment of a subject vehicle.

In the intention discrimination processing, the blinker control device is configured to:

specify, based on the travel plan, which of the operation is demanded by the instruction for lighting among the lane change operation, the divergent operation and the interfluent operation;

calculate, based on the driving environment information, a distance between the subject vehicle and a following vehicle in a destination lane at the lane change whose position is the closest to the subject vehicle and a collision prediction time between the following vehicle and the subject vehicle; and when the instruction for lighting is specified to demand the lane change operation, the distance is lower than a second threshold and the collision prediction time is lower than a third threshold, discriminate that the intention for lane change is cut-in.

In the timing setting processing, the blinker control device is configured to set a start timing of the lighting operation, based on a discrimination result where the intention for lane change is cut-in, to a timing earlier than a default value for start.

A fourth aspect of the present disclosure has the following features according to the first aspect.

The vehicle control system further comprises an information acquisition device.

The information acquisition device is configured to acquire driving environment information indicating driving environment of a subject vehicle.

In the intention discrimination processing, the blinker control device is configured to:

specify, based on the travel plan, which of the operation is demanded by the instruction for lighting among the lane change operation, the divergent operation and the interfluent operation; and when the instruction for lighting is specified to demand the lane change operation and a branch lane which is a lane for the destination is recognized based on the driving environment information, discriminate that the intention for lane change is vital lane change for reaching destination.

In the timing setting processing, the blinker control device is configured to set a start timing of the lighting operation, based on a discrimination result where the intention for lane change is vital lane change for reaching destination, to a timing earlier than a default value for start.

A fifth aspect of the present disclosure has the following features according to the first aspect.

In the intention discrimination processing, the blinker control device is configured to:

specify, based on the travel plan, which of the operation is demanded by the instruction for lighting among the lane change operation, the divergent operation and the interfluent operation; and when the instruction for lighting is specified to demand the interfluent operation, discriminate that intention for lane change is interflow.

In the timing setting processing, the blinker control device is configured to set a start timing of the lighting operation, based on a discrimination result where the intention for lane change is interflow, to a timing earlier than a default value for start.

A sixth aspect of the present disclosure has the following features according to the first aspect.

The vehicle control system further comprises an information acquisition device.

The information acquisition device is configured to acquire driving environment information indicating driving environment of a subject vehicle.

In the timing setting processing, the blinker control device is configured to:

set an exit timing of the lighting operation to a default value for exit determine, based on the driving environment information, whether or not a surrounding vehicle traveling along a destination lane at the lane change exist within a predetermined distance in front and back of the subject vehicle; and change the exit timing to a timing earlier than the default value for exit when it is judged that the surrounding vehicle is not exist.

A seventh aspect of the present disclosure is a vehicle control system for solving the problem described above and has the following features.

The vehicle control device comprises a travel control device and a blinker control device.

The travel control device is configured to execute an automatic driving including a lane change operation, a divergent operation or an interfluent operation in accordance with a travel plan from a start point to a destination.

The blinker control device is configured to execute a lighting operation of a blinker in synchronization with the execution of the lane change operation, the divergent operation or the interfluent operation which is executed in response to an instruction for lighting from the travel control device.

The blinker control device is also configured to execute intention discrimination processing, timing setting processing and threshold setting processing.

The intention discrimination processing is processing to discriminate an intention for lane change in the instruction for lighting.

The timing setting processing is processing to set a period of the lighting operation variably based on a discrimination result of the intention discrimination processing.

The threshold setting processing is processing to set a discrimination threshold used for the intention discrimination processing.

In the threshold setting processing, the blinker control device is configured to change the discrimination threshold to a tempered value when it is discriminated in the intention discrimination processing that the intention for lane change is cut-in or vital lane change for reaching destination.

The blinker control device is also configured to execute the intention discrimination processing again after the discrimination threshold is changed.

When it is discriminated in the intention discrimination processing that the intention for lane change is cut-in, the blinker control device is configured to set, in the timing setting processing, a start timing of the lighting operation to a timing earlier than a default value for start.

According to the first aspect, the intention for lane change in the instruction for lighting is discriminated and the blinker lighting operation period is set variably in accordance with the intention for lane change. Therefore, it is possible to convey the intention for lane change around the subject vehicle and to raise success rate of the lane change.

According to the second or third aspect, when it is discriminated that the intention for lane change is cut-in, the start timing is set to be the earlier timing than the default value for start. Therefore, as compared to a case of using the default value for start, it is possible to execute the lighting operation for a long period and to appeal to surroundings of the subject vehicle about the lane change operation thereof. Therefore, it is possible to raise the success rate of cut-in.

According to the fourth aspect, when it is discriminated that the intention for lane change is vital lane change for reaching destination, the start timing is set to be the earlier timing than the default value for start. Therefore, as compared to a case of using the default value for start, it is possible to execute the lighting operation for a long period and to appeal to surroundings of the subject vehicle about the lane change operation thereof. Therefore, it is possible to raise the success rate of vital lane change for reaching destination.

According to the fifth aspect, when it is discriminated that the intention for lane change is interflow, the start timing is set to be the earlier timing than the default value for start. Therefore, as compared to a case of using the default value for start, it is possible to execute the lighting operation for a long period and to appeal to surroundings of the subject vehicle about the lane change operation thereof. Therefore, it is possible to raise the success rate of interflow.

According to the sixth aspect, even when the exit timing is set to the default value for exit, when there is no surrounding vehicle in the destination lane at the lane change, the exit timing set to be the earlier timing than the default value for exit. Therefore, it is possible to prevent the driver from feeling uncomfortable that the lighting operation of blinker continues for a while after the completion of the lane change despite the absence of the surrounding vehicle.

According to the seventh aspect, when it is discriminated that the intention for lane change is cut-in, the start timing is set to be the earlier timing than the default value for start. Therefore, it is possible to have at least the same effect as the second or third aspect. In addition, according to the seventh aspect, when it is discriminated that the intention for lane change is vital lane change for reaching destination or interflow, the discrimination threshold is changed to the tempered value, and thereafter the intention discrimination processing is executed. Therefore, even when it is strictly discriminated that the intention for lane change is vital lane change for reaching destination or interflow, it is possible to discriminate again that the intention for lane change is extended cut-in and to make a necessary appeal to surroundings of the subject vehicle.

DESCRIPTION OF EMBODIMENT

Figure 1:
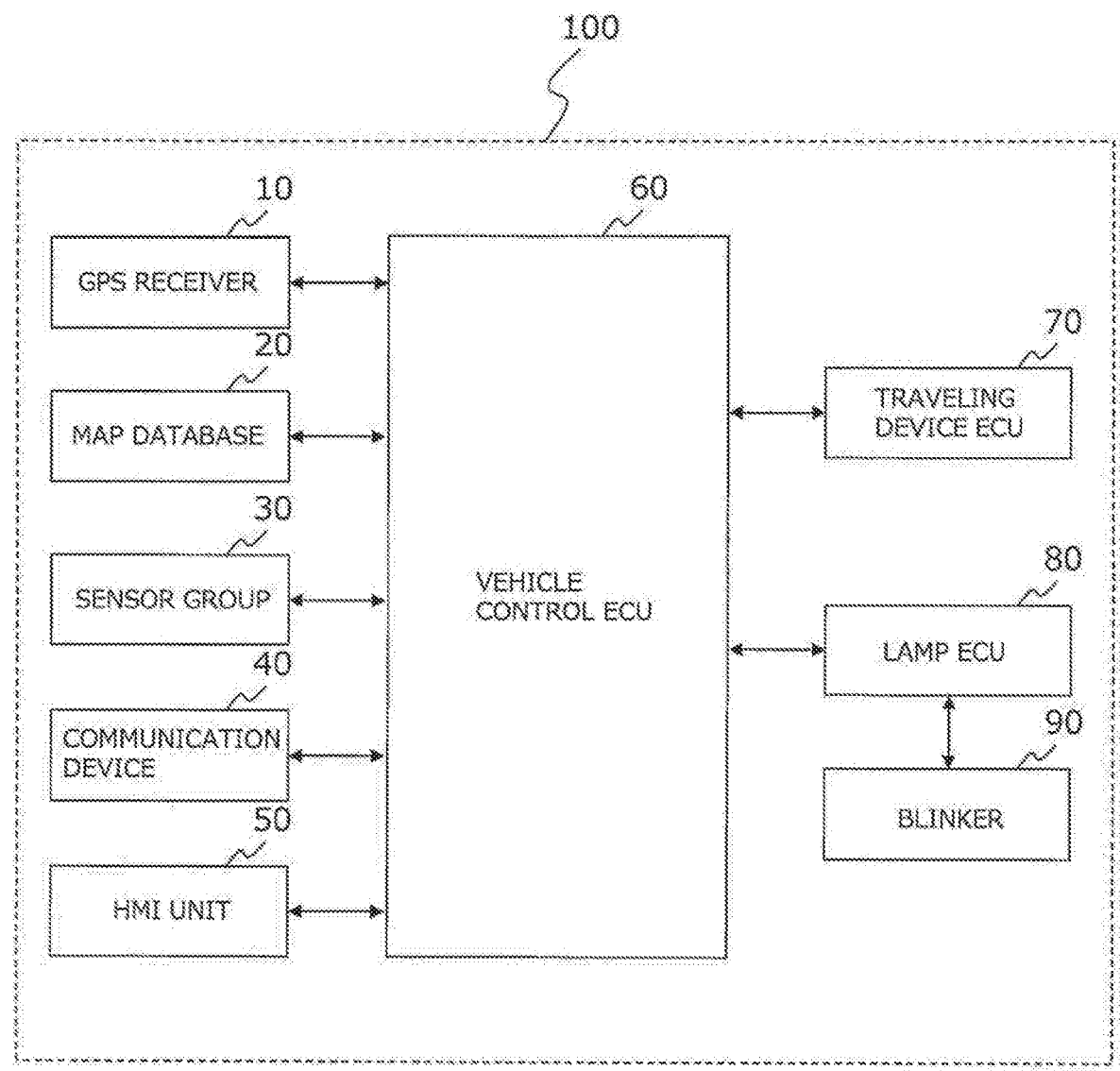
FIG. 1 is a block diagram for showing a configuration example of a vehicle control system according to a first embodiment of the present disclosure.

Hereinafter, an embodiment of the present disclosure will be described based on the accompanying drawings. Note that elements that are common to the respective drawings are denoted by the same reference characters and a duplicate description thereof is omitted. Further, the present disclosure is not limited to the embodiment described hereinafter.

First Embodiment

A first embodiment of the present disclosure will be described with reference to FIGS. 1 to 9.
1. Configuration of Vehicle Control System FIG. 1 is a block diagram for describing a configuration of a vehicle control system according to the first embodiment. The present system is mounted on a vehicle and is configured to control automatic driving of the vehicle. The vehicle equipped with the present system (hereinafter also referred to as "subject vehicle OV") is a vehicle which is powered by an internal combustion engine such as a diesel engine and a gasoline engine, an electronic vehicle which is powered by an electric motor, or a hybrid vehicle which is powered by an internal combustion engine or a motor. The motor is driven by a battery such as a secondary battery, a hydrogen fuel cell, a metal fuel cell and an alcohol fuel cell.

The vehicle control system 100 shown in FIG. 1 includes a GPS (Global Positioning System) receiver 10, a map database 20, a sensor group 30, a communication device 40, an HMI (Human Machine Interface) unit 50, a vehicle control ECU (Electronic Control Unit) 60, a traveling device ECU 70, a lamp ECU 80 and a blinker 90.

The GPS receiver 10 is a device which receives signals from three or more GPS Satellites. The GPS receiver 10 calculates position and posture (orientation) of the subject vehicle OV based on the received signal. The GPS receiver 10 transmits the calculated information (hereinafter also referred to as "information on position and posture") to the vehicle control ECU 60.

The map database 20 stores data of map information. The data of the map information includes, for example, data on positions such as roads, intersections, interfluent points and divergent points, data on road shape (e.g., road type such as straight and curve, road width, road gradient and road curvature), data on road type (e.g., expressway, toll road and national highway), data on boundary position of lane. The boundary position is represented by a set of plural points or plural lines. The map database 20 is stored in a predetermined storage device (e.g., a hard disk and a flash memory).

The sensor group 30 detect circumstances and running state of the subject vehicle OV. Examples of the sensor group 30 include LIDER (Laser Imaging Detection and Ranging), a radar, a camera, a luminance sensor and a vehicle speed sensor. The LIDER uses light to detect a landmark around the subject vehicle OV. The radar using radio waves to detect the landmark around the subject vehicle OV. The camera images situation around the subject vehicle OV. The luminance sensor detects luminance at the subject vehicle OV. The vehicle speed sensor detects speed of the subject vehicle OV. The sensor group 30 send detected information (hereinafter also referred to as "information on sensor detection") to the vehicle control ECU 60.

The communication device 40 executes Vehicle-to-Everything communication (e.g., Vehicle-to-Vehicle communication and Vehicle-to-Infrastructure communication). Specifically, the communication device 40 executes V2V communication (i.e, Vehicle-to-Vehicle communication) with other vehicles. In addition, the communication device 40 executes V2I communication (i.e., Vehicle-to-Infrastructure communication) with the surrounding infrastructures. Through Vehicle-to-Everything communication, the communication device 40 obtains information on surrounding environment of the subject vehicle OV. The communication device 40 sends the obtained information (hereinafter also referred to as "communication information") to the vehicle control ECU 60.

The HMI unit 50 is an interface for providing information to the driver and accepting information from the driver. For example, the HMI unit 50 has an input device, a display device, a speaker and a microphone. Examples of the input device includes a touch panel, a keyboard, a switch, and a button. The driver is able to input information to the HMI unit 50 using the input device. The HMI unit 50 transmits information input from the driver to the vehicle control ECU 60.

The vehicle control ECU 60 executes automatic driving control in which the automatic driving of the subject vehicle OV is controlled. Typically, the vehicle control ECU 60 is a microcomputer including a processor, a memory, and an input and output interface. The vehicle control ECU 60 receives various information via the input and output interface. Then, the vehicle control ECU 60 executes the automatic driving control based on the received information. Specifically, the vehicle control ECU 60 creates a travel plan of the subject vehicle OV, and outputs information to the traveling device ECU 70 and the lamp ECU 80 so that the subject vehicle OV travels in accordance with the travel plan.

The traveling device ECU 70 and the lamp ECU 80 are microcomputers having a typical configuration similar to that of the vehicle control ECU 60. The traveling device ECU 70 is composed of a plurality of ECUs. These ECUs respectively control various traveling devices (not shown) for causing the subject vehicle OV to travel in accordance with the information which was input from the vehicle control ECU 60. These driving devices are electronically controlled and include an output device of driving force for travel, a steering device and a brake device.

The output device of driving force for travel is a power source that generates driving force. The steering device steers the wheels. The brake device generates a braking force. The lamp ECU 80 controls lighting and turning-off operation of a lamp device in accordance with the information which was input from the vehicle control ECU 60. The lamp device includes headlights, backlights, blinker lamps and brake lamps. In FIG. 1, a blinker 90 including this blinker lamps is drawn.

2. Configuration of Vehicle Control ECU 60

Figure 2:
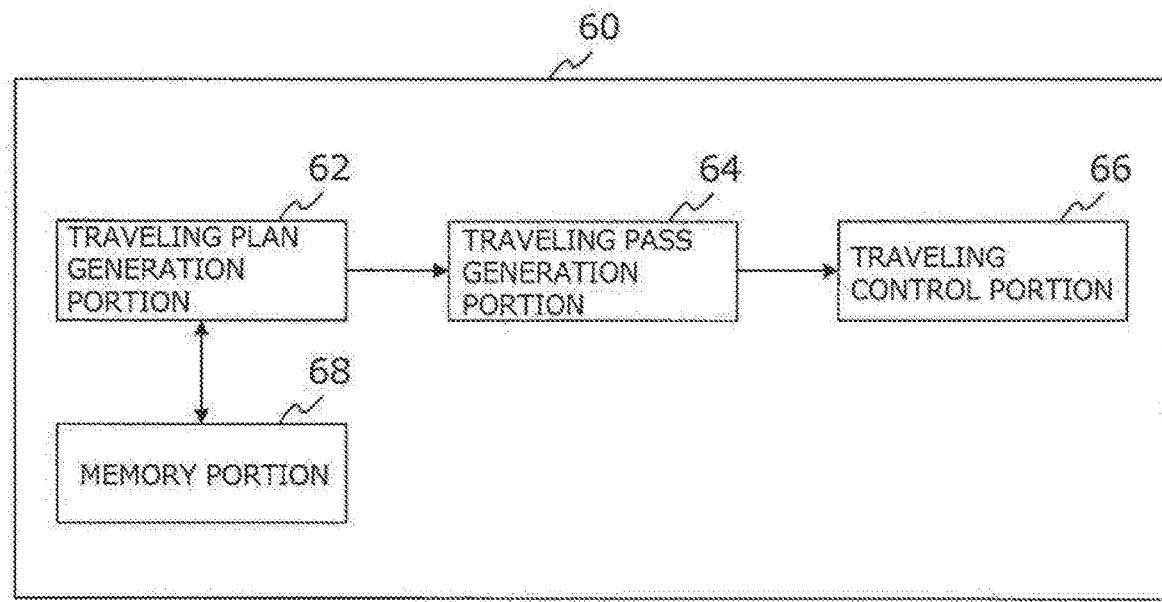
FIG. 2 is a block diagram for showing a functional configuration example of a vehicle control ECU.

FIG. 2 is a block diagram for showing a functional configuration example of the vehicle control ECU shown in FIG. 1. As shown in FIG. 2, the vehicle control ECU 60 includes a traveling plan generation portion 62, a traveling pass generation portion 64, a traveling control portion 66 and a memory portion 68. These function blocks are realized when the processor of the vehicle control ECU 60 executes a control program stored in the memory portion 68.

The portion 62 sets a start point and a destination of the automatic driving. The start point may be current location of the subject vehicle OV. The start point may be an entrance of a road section where an automatic driving mode is selected (e.g., a highway section). The portion 62 generates the travel plan in a predetermined route from a start point to a destination. The travel plan includes a plurality of events executed sequentially. The event includes, for example, an acceleration event, a deceleration event, a lane keep event, a lane change event, a divergent event and an interfluent event.

The acceleration event is an event in which the subject vehicle OV is accelerated. The deceleration event is an event in which the subject vehicle OV is decelerated. The lane keep event is an event in which the subject vehicle OV is controlled so as not to deviate from a lane on which the subject vehicle OV is traveling (hereinafter also referred to as a "traveling lane"). The lane change event is an event in which the traveling lane is changed between two lanes adjacent to each other. The divergent event is an event in which the traveling lane is changed near a divergent point from a main line to a branch lane. The interfluent event is an event in which the traveling lane is changed near an interfluent point from an interflow lane to the main line.

The portion 62 generates the travel plan such that an event suitable for each scene is executed in the predetermined route. Information on the generated travel plan is stored in the portion 68 as information on traveling plan. The portion 62 changes (updates) the generated travel plan based on the information on sensor detection.

Generally, situation around a vehicle changes constantly while the vehicle travels. For example, when a preceding vehicle rapidly decelerates in the traveling lane, it is necessary for the subject vehicle OV to change its speed or the traveling lane in accordance with this rapid deceleration operation. In such a case, the portion 62 appropriately changes the travel plan based on the information on sensor detection. Information indicating the changed travel plan is stored in the portion 68 in the same manner as the travel plan before the change.

The portion 64 generates a travel path based on the travel plan generated by the portion 62. The travel path is a collection of target positions to which a reference position of the subject vehicle OV (e.g., a center of the subject vehicle OV or a center of a rear wheel axis) arrives in the future. The target positions are set every time at which predetermined time elapses from current time.

The travel path for lane keep event is generated as follows. For example, a traveling mode is firstly determined. The traveling mode includes cruise control, following travel and curve travel. The cruise control is a traveling mode which is selected when no surrounding vehicle exist in front of the subject vehicle OV. The following travel is a traveling mode which is selected when the preceding vehicle is present. The curve travel is a traveling mode which is selected when the subject vehicle OV reaches a curve. Subsequently, target speed (or target acceleration) of the subject vehicle OV is calculated based on the determined or selected traveling mode. Subsequently, the travel path is generated based on the calculated target speed.

The travel path for lane change is generated as follows. For example, it is confirmed that there is no surrounding vehicle interfering with the lane change event exists around the subject vehicle OV. The surrounding vehicles are vehicles which travels around the subject vehicle OV and runs in the same direction as the subject vehicle OV. Herein, the wording "there is no surrounding vehicle interfering with the lane change event" means that there is no surrounding vehicle within a predetermined distance ahead of the subject vehicle OV in the traveling lane and also there is no surrounding vehicle within a predetermined distance in front and rear of the subject vehicle OV in the destination lane at the lane change. After confirming this absence, a start position and a target position of the lane change event are set. Subsequently, the target speed and the target yaw rate of the subject vehicle OV at the target position are calculated. Subsequently, the travel path is generated based on the calculated target speed and target yaw rate.

When there is a surrounding vehicle interfering with the lane change event, displacement of a future position of the surrounding vehicle is predicted by a predetermined speed model. The predetermined speed model includes a constant acceleration model, a constant acceleration model and a constant jerk model. The constant acceleration model is a model to assume that the surrounding vehicle keeps running at its current speed. The constant acceleration model is a model to assume that the surrounding vehicle keeps running at its current acceleration. The constant jerk model is a model to assume that the surrounding vehicle keeps running at its current jerk. Subsequently, based on the predicted future position and current speed of the subject vehicle OV, a start position and a target position are set such that the subject vehicle OV is able to execute the lane change without interfering with the surrounding vehicle. Subsequently, the target speed and the target yaw rate of the subject vehicle OV at the target position are calculated, and the travel path is generated.

The method of generating travel paths for divergent or interfluent event is basically the same as that for lane change event. That is, when generating the travel path for divergent event, the original lane at the lane change (i.e., the traveling lane) should be replaced with the main line and the destination lane at the lane change should be replaced with the branch lane. When generating the travel path for interfluent event, the original lane at the lane change should be replaced with the interflow lane and the destination lane at the lane change should be replaced with the main line.

The portion 66 determines which information will be output to the traveling device ECU 70 and the lamp ECU 80 based on the travel path generated by the portion 64. For example, the portion 66 determines control amount of the traveling device such that the subject vehicle travels along the generated travel path. The portion 66 appropriately adjusts the determined control amount based on the information on sensor detection and the communication information.

3. Configuration of Lamp ECU 80

Figure 3:
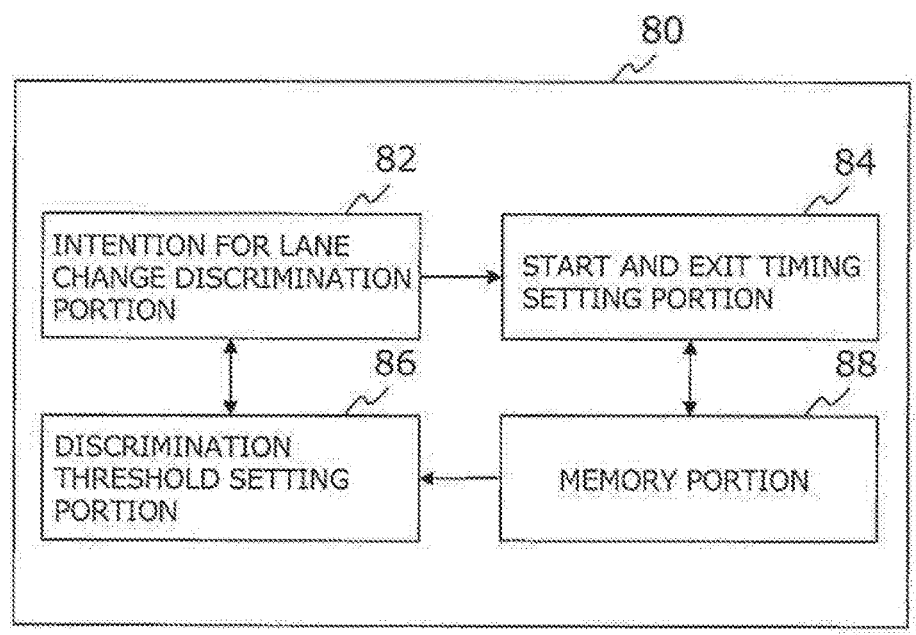
FIG. 3 is a block diagram for showing a functional configuration example of a lamp ECU.

FIG. 3 is a block diagram for showing a functional configuration example of the lamp ECU shown in FIG. 1. Among the functions of the lamp ECU 80, functions particularly related to a lighting operation (more accurately, a flashing operation) of the blinker 90 in the lane change event, the divergent event or the interfluent event are drawn in FIG. 3. As shown in FIG. 3, the lamp ECU 80 includes an intention for lane change discrimination portion 82, a start and exit timing setting portion 84, a discrimination threshold setting portion 86 and a memory portion 88. These function blocks are realized when the processor of the lamp ECU 80 executes a control program stored in the memory portion 88.

The portion 82 executes intention discrimination processing when it receives from the vehicle control ECU 60 an instruction for controlling the blinker 90. The intention discrimination processing is processing to discriminate what type of pattern for the lane change operation was demanded in the instruction for controlling of the blinker 90. The portion 84 executes timing setting processing based on a discrimination result of the intention discrimination processing. The timing setting processing is processing to set a start timing and an exit timing of the lighting operation of the blinker 90. The portion 86 executes threshold setting processing. The threshold setting processing is processing to set various thresholds necessary for the intention discrimination processing. Details of these processing will be described below.

4. Intension Discrimination Processing and Timing Setting Processing

Figure 4:
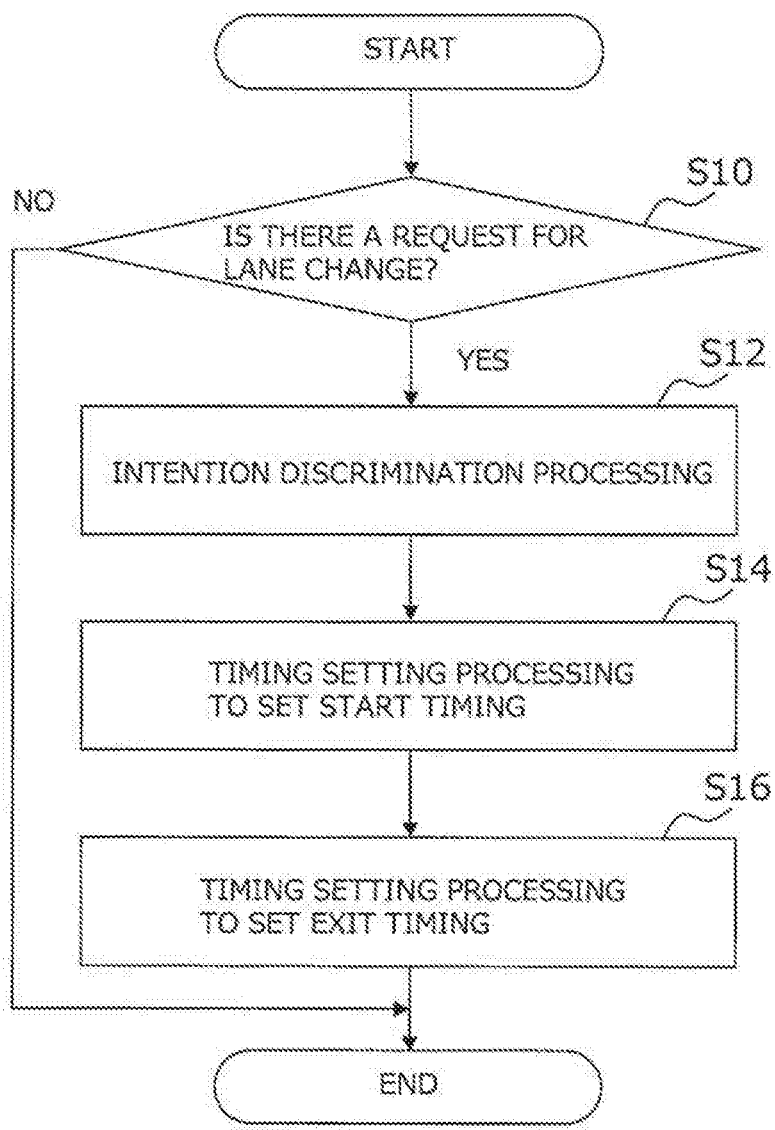
FIG. 4 is a flowchart for describing intention discrimination processing and timing setting processing executed by the lamp ECU.

FIG. 4 is a flowchart for describing intention discrimination processing and timing setting processing executed by the lamp ECU. In the routine shown in FIG. 4, firstly, it is judged whether there is a request for lane change (step S10). The presence or absence of the request for lane change is judged depending on whether or not the lamp ECU 80 accepts the instruction for controlling of the blinker 90. When it is judged that there is no request for lane change, the lamp ECU 80 exits this routine.

4.1 Intension Discrimination Processing

In step S10, when it is judged that there is the request for lane change, the intention discrimination processing is executed (step S12). The intention of the lane change is narrowed down based on various information and information relating to the events included in the travel plan. The information relating to the events is acquired when the lamp ECU 80 accesses the vehicle control ECU 60 (more precisely, the lamp ECU 80 accesses to the memory portion 68 in which the travel plan is stored). Various information is the information on position and posture, the map information, the information on sensor detection and the communication information. Hereinafter, these pieces of information are collectively referred to as "driving environment information" indicating driving environment of the subject vehicle OV.

FIGS. 5 to 9 are diagrams for describing some scenes in which lane change operations are executed in response to some requests for lane change.

Pattern 1: Overtaking

Figure 5:
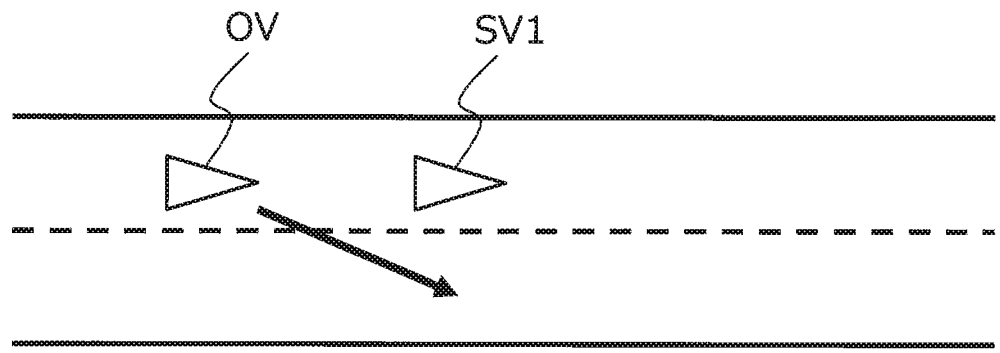
FIG. 5 is a diagram for describing a first scene in which a lane change operation is executed in response to a request for lane change.
Figure 6:
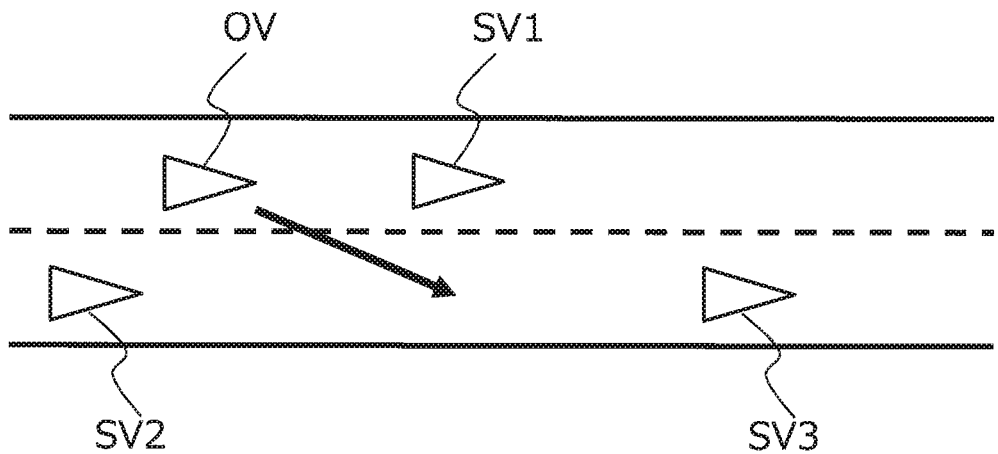
FIG. 6 is a diagram for describing a second scene in which a lane change operation is executed in response to another request for lane change.

In FIGS. 5 and 6, a first and a second scenes are drawn in which the subject vehicle OV during the lane keeping operation passes a surrounding vehicle SV1. In each scene, the travel plan was changed based on the information on sensor detection and the changed travel path is applied. That is, the travel path for lane change event is applied.

Pattern 1.1: Simple Overtaking

In the first scene shown in FIG. 5, it is assumed based on the information relating to the events that an event related to the request for lane change is narrowed down to the lane change event. In this first scene, it is also assumed that only a surrounding vehicle SV1 is recognized based on the information on sensor detection. Then, in the intention discrimination processing, it is judged that an intention of the lane change related to the request for lane change (hereinafter also referred to as an "intention for lane change") is a simple overtaking.

Pattern 1.2: Overtaking with Cut-in

In the second scene shown in FIG. 6, it is assumed based on the information relating to the events that the event related to the request for lane change is narrowed down to the lane change event. In this second scene, surrounding vehicle SV1, SV2 and SV3 are assumed to be recognized based on the information on sensor detection. Further, in this second scene, it is also assumed that the surrounding vehicles SV2 and SV3 are surrounding vehicles satisfying a predetermined cut-in condition. Then, in the intention discrimination processing, it is judged that the intention for lane change is an overtaking with cut-in. More specifically, it is judged that the intention for lane change is cut-in between the surrounding vehicles SV2 and SV3 or in an overtaking with cut-in in front of the surrounding vehicle SV2.

The predetermined cut-in condition is preset, for example, based on the following parameters (1) to (3).
(1) A density DS of the surrounding vehicles in the destination lane at the lane change
(2) A distance DI between the subject vehicle OV and the surrounding vehicle SV2
(3) A collision prediction time TTC (Time To Collision) of the subject vehicle OV to the surrounding vehicle SV2

When the density DS is greater than or equal to a threshold TH1, it is estimated that the intention for lane change is cut-in between the surrounding vehicle SV2 and SV3. When the distance DI is less than a threshold TH2, it is estimated that the intention for lane change is cut-in to the front of the surrounding vehicle SV2. When the collision prediction time TTC is positive and the collision prediction time TIC is less than a threshold TH3, it is estimated that the intention for lane change is the cut-in to the front of the surrounding vehicle SV2.

The first scene shown in FIG. 5 and the second scene shown in FIG. 6 are common in the lane change event in that an overtaking operation is executed. However, when comparing the first and second scenes, success rate of the lane change decreases in the second scene. The reason for this is that the first scene does not have any surrounding vehicles recognized in the destination lane at the lane, whereas it is expected in the second scene that the surrounding vehicle SV2 does not permit a cut-in operation of the subject vehicle OV and intentionally closes to the surrounding vehicle SV3 to reduce a distance between the surrounding vehicles SV2 and SV3. In the second scene, therefore, in order to raise the success rate of the lane change, it is important to convey the intention for lane change accurately to the surrounding vehicle SV2. And it is desirable to convey the cut-in intention to surroundings of the subject vehicle OV at an early timing.

Pattern 2: Vital Lane Change for Reaching Destination

Figure 7:
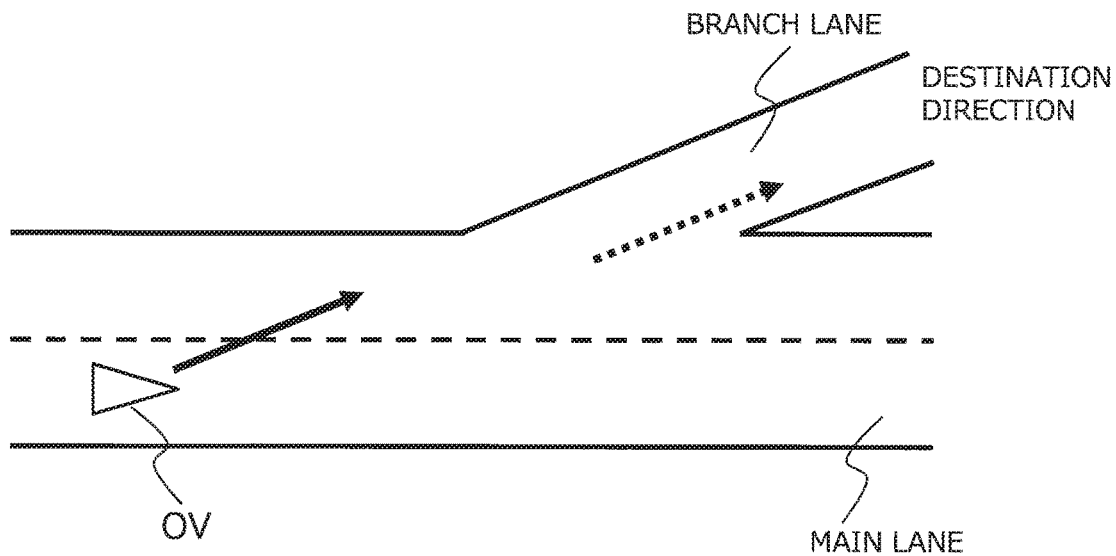
FIG. 7 is a diagram for describing a third scene in which a lane change operation is executed in response to another request for lane change.
Figure 8:
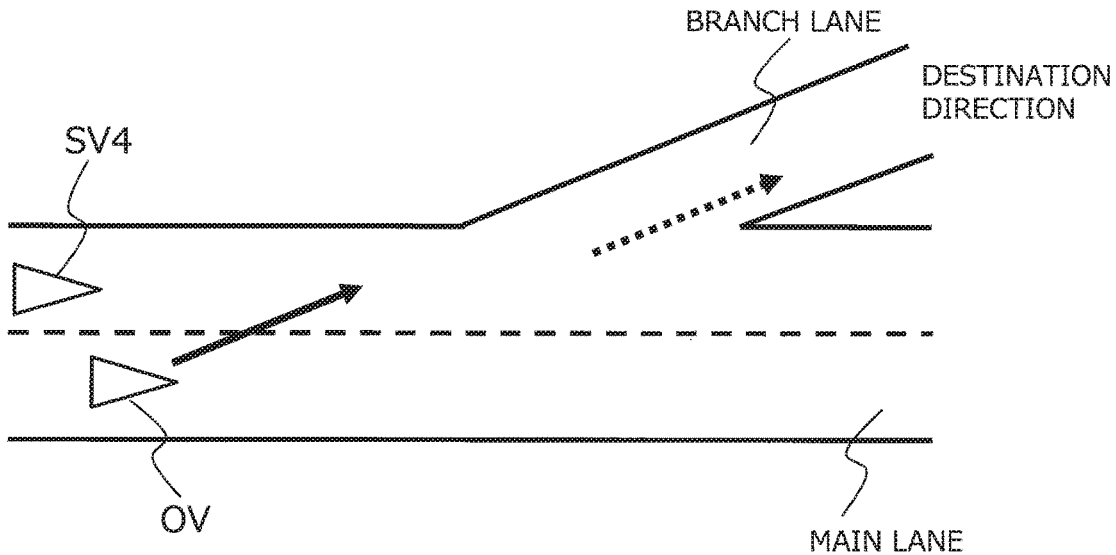
FIG. 8 is a diagram for describing a fourth scene in which a lane change operation is executed in response to another for lane change.

In FIGS. 7 and 8, a third scene and a fourth scene are drawn in which the subject vehicle OV during the lane keeping operation travels to the branch lane located in a destination direction. In each scene, there is no particular change in the travel plan and the travel path for lane change event is applied which was switched from the travel path for lane keep event. However, in each scene, the subject vehicle OV is required to complete the lane change to the lane directly connected to the branch lane (i.e., the left lane of the main lane) before the start of the divergent operation.

Pattern 2.1: Lane Change Anticipating Divergent Operation in Near Future

In the third scene shown in FIG. 7, it is assumed based on the information relating to the events that the event related to the request for lane change is narrowed down to the lane change event. In the third scene, it is also assumed that the branch lane is recognized based on the driving environment information. Further, in the third scene, it is also assumed that the destination exists ahead of the branch lane. That is, the branch lane is assumed to be the lane following the destination. Then, in the intention discrimination processing, it is judged that the intention for lane change is a lane change anticipating divergent operation in near future.

Pattern 2.2: Lane Change with Cut-in, Anticipating Divergent Operation in Near Future Likewise in the case of the third scene, in the fourth scene shown in FIG. 8, it is assumed that the event related to the request for lane change is narrowed down to the lane change event, and also the branch lane is recognized. In addition to this, in the fourth scene, it is assumed that a surrounding vehicle SV4 is recognized based on the driving environment information. Then, in the intention discrimination processing, it is judged that the intention for lane change is the lane change with cut-in, anticipating divergent operation in near future.

Here, when comparing the third scene shown in FIG. 7 and the fourth scene shown in FIG. 8, the success rate of the lane change decreases in the fourth scene. The reason for this is that the surrounding vehicle are not recognized in the left lane in third scene, whereas it is expected in the fourth scene that the surrounding vehicle SV4 does not permit the cut-in operation of the subject vehicle OV and starts its divergent operation before the lane change of the subject vehicle OV. In the fourth scene, therefore, in order to raise the success rate of the lane change, it is important to convey the intention for lane change accurately to the surrounding vehicle SV4.

It should be noted, however, that the lane change operations of the third and fourth scenes correspond to the vital lane change for reaching destination. It is desirable that such essential lane changes are successfully executed regardless of the cut-in intention. In other words, it is desirable to convey the intention for lane change to the surroundings at an early timing regardless of the surrounding vehicle SV4's existence.

Pattern 3: Interflow

Figure 9:
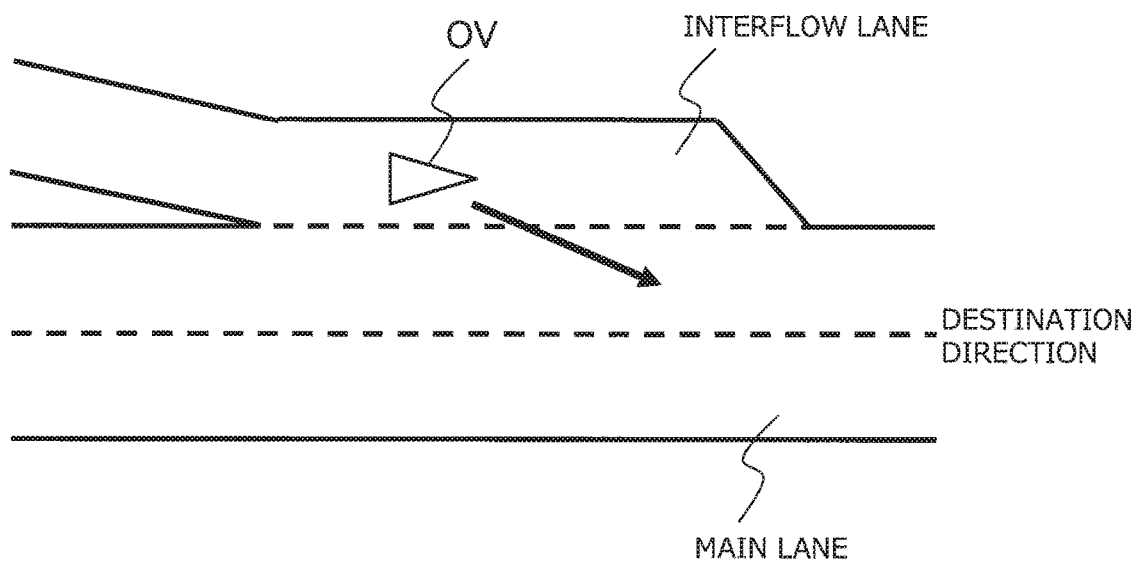
FIG. 9 is a diagram for describing a fifth scene in which a lane change operation is executed in response to another for lane change.

In FIG. 9, a fifth scene is drawn in which the subject vehicle OV during the lane keeping operation moves from the interflow lane to the main line. In this scene, there is no particular change in the travel plan and the travel path for interfluent event is applied which was switched from the travel path for lane keep event. Therefore, in the intention discrimination processing, it is judged based on information relating to the events that the intention for lane change is the interflow.

In the interfluent event, the subject vehicle OV is required to reliably interflow from the interflow lane to the main line. In other words, an interfluent operation is required to be executed successfully. Therefore, in order to raise the success rate of the interflow in the fifth scene, it is desirable to convey the intention for interfluent operation to the surroundings at an early timing.

It is noted that successful execution is required not only for the interfluent operation but also for the divergent operation. However, because of the divergent operation' character, adjusting the timing to convey the intention for divergent operation to the surroundings does not affect the success rate of the divergent operation. Therefore, in the intention discrimination processing, it is not positively discriminated whether or not the intention for lane change is a branch.

Considering the above pattern, in the intention discrimination processing, it is judged whether the intention for lane change corresponds to any one of the following (1) to (3).
(1) The cut-in (see the pattern 1.2)
(2) The vital lane change for reaching destination (see the pattern 2)
(3) The interflow (see the pattern 3)

4.2 Timing Setting Processing

Returning to the description of the flowchart of FIG. 4. Subsequent to the step S12, timing setting processing is executed (steps S14 and S16). In the timing setting processing, a discrimination result in the step S12 is referred.

4.2.1 in Case of Negative Discrimination Result

When the discrimination result in the step S12 is negative, that is, when it is judged that the intention for lane change does not correspond to any of the intentions (1) to (3), the start timing and the exit timing of the lighting operation are set to default values for each timing (steps S14 and S16).

The default value for start timing of the lighting operation (the default value for start) is preset to a predetermined time (e.g., several seconds) before the start timing of the steering operation according to the travel path.

The default value for exit timing of the lighting operation (the default value for exit) is preset at a timing at which success of the lane change operation is confirmed. A successful lane change operation means that a reference position of the subject vehicle OV goes beyond a boundary position to the destination lane at the lane change and also a deviation between the boundary position and the reference position of the destination lane at the lane change is equal to or greater than a threshold TH4. The threshold TH4 is preset to a value at which it can be determined that the reference position of the subject vehicle OV has moved to the destination lane at the lane change.

However, the exit timing of the lighting operation may be set earlier than the default value therefor based on the driving environment information. Specifically, the lighting operation may be ended when it is judged that there is not any surrounding vehicles in a predetermined distance of front and back of the subject vehicle OV in the destination lane at the lane change. In other words, the determination using the threshold TH4 may be omitted and the lighting operation may be ended when it is judged that the reference position of the subject vehicle OV goes beyond the boundary position to the destination lane at the lane change.

4.2.2 in Case of Positive Discrimination Result

When the discrimination result in the step S12 is positive, that is, when it is judged that the intention for lane change falls under any of the intentions (1) to (3), the start timing of the lighting operation is set to be an earlier timing than the default timing for start. For example, an advance time of the start timing is obtained by multiplying the predetermined time with a coefficient (>1.0).

The exit timing of the lighting operation is set based on whether or not the intention for lane change corresponds to cut-in. This determination is executed by determining whether or not the predetermined cut-in condition described in the pattern 1.2 is satisfied in the surrounding vehicles of the destination lane at the lane change.

When it is judged that the intention for lane change corresponds to cut-in, the exit timing of the lighting operation is set to the timing at which the completion of the lane change operation is confirmed. In this example, the completion of the lane change operation is confirmed when the reference position of the subject vehicle OV matches the central position of the destination lane at the lane change. As a result, when it is judged that the intention for lane change corresponds to cut-in, the exit timing of the lighting operation is set to be a later timing than that of the case where the default value for exit is applied.

When it is judged that the intention for lane change does not correspond to cut-in, the exit timing of the lighting operation is set to the default value for exit. However, the exit timing of the lighting operation may be set to an earlier timing than the default value for exit based on the driving environment information. In other words, when it is judged that the intention for lane change corresponds to the intention (2) or (3), the timing of the lighting operation may be set to the same timing as when it is judged that the intention for lane change does not correspond to any of the intentions (1) to (3).

4.3 Threshold Setting Processing

In the threshold setting processing, various thresholds required for the intention discrimination processing are set. Specifically, the various thresholds are the thresholds TH1 to TH3, all of which are set to default values in the initial condition. These default values are changed when driver's preference is input via the HMI unit 50. For example, when the driver prefers adequate appeal to the surroundings, the threshold TH1 (density) is changed to a smaller value. In this case, the threshold TH2 (distance) is changed to a longer value and the threshold TH3 (collision prediction time) is changed to a shorter value than the current value. On the other hand, when the driver prefers a redundant appeal to the surroundings, the threshold TH1 is changed to a larger value than the current value. In this case, the threshold TH2 is changed to a shorter value and the threshold TH3 is changed to a longer value than the current value.

5. Effect

According to the vehicle control system of the first embodiment described above, a period of the lighting operation of the blinker 90 is changed through the execution of the intention discrimination processing and the timing setting processing. In particular, in the cases of the above patterns 1.2, 2 and 3, the lighting operation of the blinker 90 is started at the early timing. Therefore, it is possible in these case that the lane change operation or the interfluent operation is strongly appealed to the surrounding vehicles. Therefore, it is possible to ask the surrounding vehicles which travels along the destination lane at the lane change to leave a safe space for the lane change operation and to increase the success rate of the lane change operation or the interfluent operation.

Further, in the pattern 1.2, the lighting operation of the blinker 90 is continued until the later timing. Therefore, it is possible to strongly appeal to a following vehicle whose position is the closest to the subject vehicle (i.e., the surrounding vehicle SV2) that the lane change operation has been unfinished. Therefore, it is possible to ask the closest following vehicle to pay attention to movement of the subject vehicle OV and also to inform the closest following vehicle not excessively approach to the subject vehicle OV.

In addition, in the patterns other than the pattern 1.2, when surrounding vehicle do not exist within the predetermined distance of the front and back of the subject vehicle OV in the destination lane at the lane change, the lighting operation of the blinker 90 is rounded up at an early timing. Therefore, despite the absence of surrounding vehicle, it is possible to prevent the driver from feeling uncomfortable that the lighting operation of blinker 90 will continue. In other words, the lighting operation of the blinker 90 with less discomfort for the driver is realized.

In the first embodiment described above, the vehicle control ECU 60 and the traveling device ECU 70 correspond to the "travel control device" of the first or seventh aspect. The lamp ECU 80 corresponds to the "blinker control device" of the first or seventh aspect. The GPS receiver 10, the map database 20, the sensor group 30 and the communication device 40 correspond to the "information acquisition device" of the second to fourth aspect or the sixth aspect.

Second Embodiment

Next, the second embodiment of the present disclosure will be described with reference to FIG. 10. Hereinafter, parts being different from the first embodiment and characteristic parts of the second embodiment will be described. The description of the parts overlapping with the first embodiment will be omitted.

1. Premise of Vehicle Control System According to Second Embodiment

In the timing setting processing of the first embodiment, the pattern 2 or 3 was treated in the same way as in the pattern 1.2. In the second embodiment, however, they are not treated in the same way. These patterns are distinguished between the pattern 1.2 and the other patterns. In the second embodiment, the thresholds TH1 to TH3 are changed in the threshold setting processing.

2. Threshold Setting Processing

In the threshold setting processing, when it was judged in the intention discrimination processing that intention for lane change corresponds to the intention (2) or (3), the thresholds TH1 to TH3 are changed. Specifically, the threshold TH1 (density) is changed to a smaller value than the current value. The threshold TH2 (distance) is changed to a longer value than the current value. The threshold TH3 (collision prediction time) is changed to a shorter value than the current value. That is, the predetermined cut-in condition is tempered. When the predetermined cut-in condition is tempered, the possibility that the intention for lane change is discriminated to cut-in is increased.

3. Specific Processing

Considering the premise and the change in the thresholds TH1 to TH3, the processing executed by the lamp ECU 80 will be described as follows. FIG. 10 is a flowchart for describing an example of characteristic processing in the second embodiment. The routine shown in FIG. 10 is executed repeatedly every time at which it is judged that there is the request for lane change. The presence or absence of the request for lane change is judged depending on whether or not the lamp ECU 80 accepts the instruction for controlling of the blinker 90.

Figure 10:
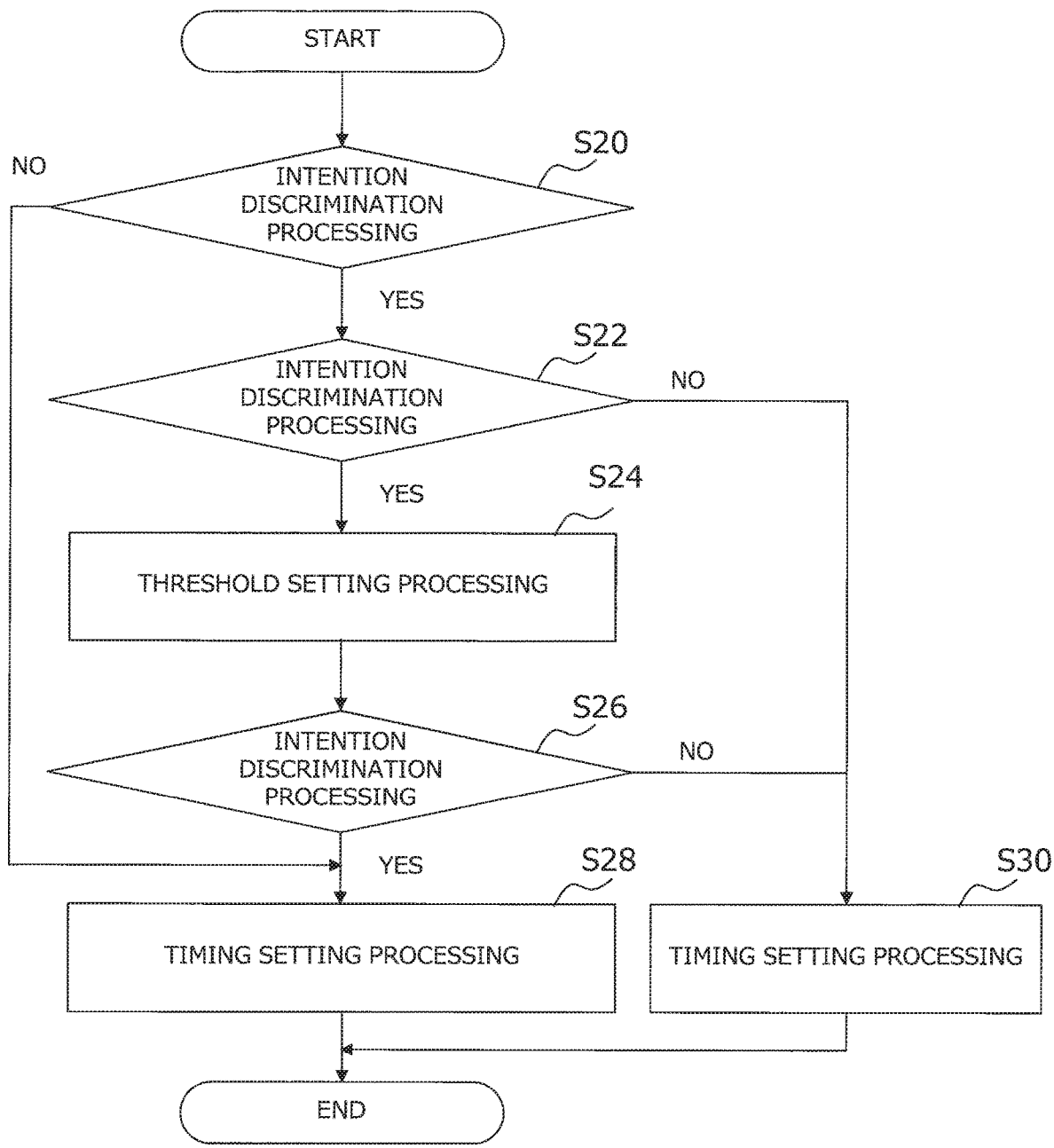
FIG. 10 is a flowchart for describing an example of a characteristic processing in a second embodiment of the present disclosure.

In the routine shown in FIG. 10, firstly, the intention discrimination processing is executed (steps S20 and S22). In this intention discrimination processing, firstly, it is judged whether or not the intention for lane change is the intentions other than cut-in (step S20). When the discrimination result of step S20 is negative, processing of the step S28 is executed. The content of the step S28 will be described later.

When the judgement result of the step S20 is positive, it is judged whether or not the intention for lane change corresponds to the vital lane change for reaching destination or the interflow (step S22). When the judgement result of the step S22 is negative, processing of the step S30 is executed. The content of the step S30 will be described later.

When the judgement result of the step S22 is positive, the threshold setting processing is executed (step S24). When the processing of the step S24 is executed, the predetermined cut-in condition is tempered as already described.

Subsequent to the step S24, the intention discrimination processing is executed again (step S26). In the second processing, it is judged whether or not the intention for lane change corresponds to cut-in. When the second processing is executed, there may be cases where it is judged that the intention for lane change corresponds to cut-in whereas it was judged in the first processing that the intention for lane change corresponds to the vital lane change for reaching destination or interflow. When the judgement result of the step S26 is positive, the processing of the step S28 is executed. Otherwise, processing of the step S30 is executed.

In the step S28, the timing setting processing is executed. In the step S28, the start timing of the lighting operation is set to be an earlier timing than the default value for start. For example, an advance time of the start timing is obtained by multiplying the predetermined time with a coefficient (>1.0). In addition, the exit timing of the lighting operation is set to be a later timing than that of the case where the default value for exit is applied. For example, the exit timing of the lighting operation is set to the timing at which the completion of the lane change operation is confirmed.

Likewise the processing of the step S28, the timing setting processing is executed in the step S30. In the step S30, the start timing of the lighting operation is set to the default value for start and the exit timing of the lighting operation is set to the default value for exit.

4. Effect

According to the vehicle control system of the second embodiment described above, only when it is determined that the intention for lane change corresponds to the cut-in, the period of the lighting operation of the blinker 90 is prolonged. When it is determined that the intention for lane change corresponds to vital lane change for reaching destination or interflow, the thresholds TH1 to TH3 are changed. Accordingly, the predetermined cut-in condition is tempered and the possibility that the intention for lane change corresponds to cut-in is increased. Therefore, even when the following vehicle in the destination lane at the lane change exists far from the subject vehicle OV, it is possible to appeal the lane change operation to the following vehicle.

When it is judged that the intention for lane change corresponds to vital lane change for reaching destination or interflow despite the temper of the predetermined cut-in condition, it is expected that there is not any surrounding vehicle to appeal these operations. In this regard, when there is not any surrounding vehicle to appeal the lane change operation in the pattern 2 or 3, it is possible to prevent a wasteful appeal from starting in an early timing.

What is claimed is:

1. A vehicle control system comprising:
   a travel control device which is configured to execute an automatic driving including a lane change operation, a divergent operation or an interfluent operation in accordance with a travel plan from a start point to a destination; and
   a blinker control device which is configured to execute a lighting operation of a blinker automatically in synchronization with the execution of the lane change operation, the divergent operation or the interfluent operation in accordance with an instruction for lighting received from the travel control device; and
   an information acquisition device which is configured to acquire driving environment information indicating driving environment of a subject vehicle, wherein:
   the blinker control device is also configured to execute intention discrimination processing and timing setting processing,
   wherein the intention discrimination processing is processing to discriminate an intention for lane change in the instruction for lighting; and
   the timing setting processing is processing to set a period of the lighting operation variably based on a discrimination result of the intention discrimination processing; and
   in the intention discrimination processing, the blinker control device is also configured to:
   specify, based on the travel plan, which of the operation is demanded by the instruction for lighting among the lane change operation, the divergent operation and the interfluent operation;
   calculate, based on the driving environment information, density of vehicles on a destination lane at the lane change; and
   when the instruction for lighting is specified to demand the lane change operation and the density is greater than or equal to a first threshold, discriminate that the intention for lane change is cut-in; and
   in the timing setting processing, the blinker control device is also configured to set a start timing of the lightning operation, based on a discrimination result where the intention for lane change is cut-in, to a timing earlier than a default value for start.

2. The vehicle control system according to claim 1,
   wherein, in the timing setting processing, the blinker control device is also configured to:
   set an exit timing of the lighting operation to a default value for exit;
   determine, based on the driving environment information, whether or not a surrounding vehicle traveling along a destination lane at the lane change exist within a predetermined distance in front and back of the subject vehicle; and
   change the exit timing to a timing earlier than the default value for exit when it is judged that the surrounding vehicle is not exist.

3. A vehicle control system comprising:
a travel control device which is configured to execute an automatic driving including a lane change operation, a divergent operation or an interfluent operation in accordance with a travel plan from a start point to a destination; and
a blinker control device which is configured to execute a lighting operation of a blinker automatically in synchronization with the execution of the lane change operation, the divergent operation or the interfluent operation in accordance with an instruction for lighting received from the travel control device, wherein:
the blinker control device is also configured to execute intention discrimination processing and timing setting processing,
wherein the intention discrimination processing is processing to discriminate an intention for lane change in the instruction for lighting; and
the timing setting processing is processing to set a period of the lighting operation variably based on a discrimination result of the intention discrimination processing;
in the intention discrimination processing, the blinker control device is also configured to:
specify, based on the travel plan, which of the operation is demanded by the instruction for lighting among the lane change operation, the divergent operation and the interfluent operation; and
when the instruction for lighting is specified to demand the interfluent operation, discriminate that intention for lane change is interflow,
in the timing setting processing, the blinker control device is also configured to set a start timing of the lighting operation, based on a discrimination result where the intention for lane change is interflow, to a timing earlier than a default value for start.

4. The vehicle control system according to claim 3, further comprising:
an information acquisition device which is configured to acquire driving environment information indicating driving environment of a subject vehicle,
wherein, in the timing setting processing, the blinker control device is also configured to:
set an exit timing of the lighting operation to a default value for exit;
determine, based on the driving environment information, whether or not a surrounding vehicle traveling along a destination lane at the lane change exists within a predetermined distance in front and back of the subject vehicle; and
change the exit timing to a timing earlier than the default value for exit when it is judged that the surrounding vehicle does not exist.

5. A vehicle control system comprising:
at least one electronic control unit (ECU) programmed to:
generate a travel plan for a subject vehicle;
execute an automatic driving including a lane change operation, a divergent operation or an interfluent operation in accordance with the travel plan from a start point to a destination;
execute a lighting operation of a blinker automatically in synchronization with the execution of the lane change operation, the divergent operation or the interfluent operation in accordance with an instruction for lighting; and
acquire driving environment information indicating driving environment of the subject vehicle; and
execute intention discrimination processing and timing setting processing,
wherein the intention discrimination processing discriminates an intention for lane change in the instruction for lighting; and
the timing setting processing sets a period of the lighting operation variably based on a discrimination result of the intention discrimination processing; and
in the intention discrimination processing, specify, based on the travel plan, which of the operation is demanded by the instruction for lighting among the lane change operation, the divergent operation and the interfluent operation;
calculate, based on the driving environment information, density of vehicles on a destination lane at the lane change; and
when the instruction for lighting is specified to demand the lane change operation and the density is greater than or equal to a first threshold, discriminate that the intention for lane change is cut-in; and
based on a discrimination result that the intention for lane change is cut-in, set a start timing of the lighting operation to a timing earlier than a default value for start timing.

* * * * *